United States Patent
Chhaunker et al.

(10) Patent No.: US 10,067,940 B2
(45) Date of Patent: Sep. 4, 2018

(54) ENHANCED STORAGE QUOTA MANAGEMENT FOR CLOUD COMPUTING SYSTEMS

(75) Inventors: Gaurav Chhaunker, Hyderabad (IN); Umesh P. Gaikwad, Pune (IN); Sandeep R. Patil, Pune (IN); Gandhi Sivakumar, Bentleigh (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 220 days.

(21) Appl. No.: 13/410,840

(22) Filed: Mar. 2, 2012

(65) Prior Publication Data
US 2013/0232179 A1     Sep. 5, 2013

(51) Int. Cl.
G06F 17/30     (2006.01)
G06F 9/50     (2006.01)

(52) U.S. Cl.
CPC ........ *G06F 17/3007* (2013.01); *G06F 9/5072* (2013.01); *G06F 17/30082* (2013.01)

(58) Field of Classification Search
CPC .... G06F 17/3007; G06F 9/5072; G06F 3/067; G06F 9/45533; G06F 17/302; G06F 17/3082
USPC .................................. 707/E17.032
See application file for complete search history.

(56) References Cited

U.S. PATENT DOCUMENTS

| | | | |
|---|---|---|---|
| 5,956,734 A | 9/1999 | Schmuck et al. | |
| 7,451,176 B2* | 11/2008 | Anders et al. | 709/201 |
| 7,774,329 B1* | 8/2010 | Peddy | G06Q 30/02 |
| | | | 707/705 |
| 7,783,666 B1 | 8/2010 | Zhuge et al. | |
| RE42,153 E * | 2/2011 | Hubbard | H04L 43/50 |
| | | | 709/201 |
| 7,958,238 B1* | 6/2011 | Batz et al. | 709/225 |
| 8,396,807 B1* | 3/2013 | Yemini et al. | 705/59 |
| 8,429,630 B2* | 4/2013 | Nickolov | G06F 9/4856 |
| | | | 717/110 |
| 8,566,900 B1* | 10/2013 | Bharali et al. | 726/1 |

(Continued)

FOREIGN PATENT DOCUMENTS

CN     102255962 A * 11/2011     G06F 3/0605

OTHER PUBLICATIONS

Zhang, Guobin; Distributive storage method, device and system; English Abstract of CN102255962A; Nov. 23, 2011; p. 1.

*Primary Examiner* — Taelor Kim
*Assistant Examiner* — Jesse P Frumkin
(74) *Attorney, Agent, or Firm* — Cahn & Samuels LLP; Daniel P Morris

(57) ABSTRACT

An embodiment of the invention provides a method for storage management in a cloud computing system. More specifically, locations of storage components in the cloud computing system and storage properties of the storage components are identified. The storage properties include the amount of available storage space and/or the cost of storage space. A storage quota for a user of the cloud computing system is generated with a cloud quota management module based on the locations of the storage components and/or the storage properties of the storage components. In at least one embodiment, the storage quota includes the maximum amount of storage allocated to the user in at least one of the storage components.

13 Claims, 8 Drawing Sheets

| Geography | Amount of storage available | Cost per GB in US dollars | Total Cost |
|---|---|---|---|
| China | 6000 GB | $0.25 | $1500 |
| India | 5000 GB | $0.15 | $750 |
| Germany | 2000 GB | $0.75 | $1500 |
| US | 3500 GB | $0.50 | $1750 |

(56) References Cited

U.S. PATENT DOCUMENTS

| | | | | |
|---|---|---|---|---|
| 8,612,395 B2* | 12/2013 | Saika | ............... | G06F 3/061 |
| | | | | 707/665 |
| 2003/0149765 A1* | 8/2003 | Hubbard | ............ | G06F 11/3672 |
| | | | | 709/224 |
| 2006/0047814 A1* | 3/2006 | Batz et al. | .................. | 709/226 |
| 2009/0254572 A1 | 10/2009 | Redlich et al. | | |
| 2010/0274762 A1 | 10/2010 | Murphy et al. | | |
| 2010/0332401 A1* | 12/2010 | Prahlad et al. | ............. | 705/80 |
| 2011/0231280 A1 | 9/2011 | Farah | | |
| 2012/0110044 A1* | 5/2012 | Nagpal | ............ | G06F 17/30082 |
| | | | | 707/827 |
| 2012/0110570 A1* | 5/2012 | Jacobson et al. | ............. | 718/1 |
| 2012/0221789 A1* | 8/2012 | Felter | ........................ | 711/114 |
| 2012/0260248 A1* | 10/2012 | Katiyar et al. | ................. | 718/1 |
| 2012/0263191 A1* | 10/2012 | Baron | ........................ | 370/462 |
| 2013/0019089 A1* | 1/2013 | Guidotti et al. | ............ | 713/100 |
| 2013/0073702 A1* | 3/2013 | Umbehocker | ............. | 709/222 |
| 2013/0247034 A1* | 9/2013 | Messerli | ........................ | 718/1 |
| 2015/0234879 A1* | 8/2015 | Baldwin | .......... | G06F 17/30342 |
| | | | | 707/694 |
| 2017/0039113 A1* | 2/2017 | Helliker | ........... | G06F 17/30129 |

\* cited by examiner

| Geography | Amount of storage available | Cost per GB in US dollars | Total Cost |
|---|---|---|---|
| China | 6000 GB | $0.25 | $1500 |
| India | 5000 GB | $0.15 | $750 |
| Germany | 2000 GB | $0.75 | $1500 |
| US | 3500 GB | $0.50 | $1750 |

Scmfi>chcmfiquota –name birla_grp –geo_in India –per_size 50
If the size is available from the total available space then command will succeed. Else fail.

Scmfi>chcmfiquota –name birla_grp –geo_in China –per_size 10
If the size is available from the total available space then command will succeed. Else fail.

Scmfi>chcmfiquota –name birla_grp –geo_in US –per_size 40
If the size is available from the total available space then command will succeed. Else fail.

Scmfi>chcmfiquota –name birla_grp –geo_in Germany –per_size 10
If the size is available from the total available space then command will succeed. Else fail.

FIG. 3

ENHANCED STORAGE QUOTA MANAGEMENT FOR CLOUD COMPUTING SYSTEMS

BACKGROUND

The present invention is in the field of methods, systems and computer program products for enhanced storage quota management for cloud computing systems.

The disk quota is a protocol that is often used by system administrators to ensure that available resources are equitably and reasonably distributed among the users of the operating systems that are used by a home or business network. This process of managing the file system usage of each work station within the network helps to prevent the use of more resources by one user to the detriment of another user in the group. The system administrator normally has the ability to assign disk quotas on both a per work station basis as well as on an individual user basis. There are two basic types of disk quotas. The first, known as a "usage quota" or "block quota", limits the amount of disk space that can be used. The second, known as a "file quota" or "inode quota", limits the number of files and directories that can be created. Disk quotas are typically implemented on a per-user or per-group basis. That is, a system administrator defines a usage or file quota specific to a certain user or group.

SUMMARY OF THE INVENTION

An embodiment of the invention provides a method for storage management in a cloud computing system. More specifically, locations of storage components in the cloud computing system and storage properties of the storage components are identified. The storage properties include the amount of available storage space and/or the cost of storage space. A storage quota for a user of the cloud computing system is generated with a cloud quota management module based on the locations of the storage components and/or the storage properties of the storage components. In at least one embodiment, the storage quota includes the maximum amount of storage allocated to the user in at least one of the storage components.

BRIEF DESCRIPTION OF THE SEVERAL VIEWS OF THE DRAWINGS

The present invention is described with reference to the accompanying drawings. In the drawings, like reference numbers indicate identical or functionally similar elements.

FIG. 3 illustrates system commands to create cloud users according to an embodiment of the invention;

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention enhances the Disk Quota management of clustered file systems to be cognizant of the location of underlying storage/disks such that disk quota allocation, monitoring, and notification per customer per location can be executed in a globally enabled storage cloud offering. The methods herein help the end-users get the most economical and cost effective data storage across the globe, without worrying about the multiple underlying factors determining the local price.

An embodiment of the invention provides for storage cloud enhanced quota management that is aware of geo-wise storage availability and quota requirements. More specifically, a storage cloud management system interface (SC-MSI) reports cloud storage quota properties. The SCMSI displays key factors set by the cloud system administrator in regards to storage properties, such as percentage of disk space available within the geographic location and the cost per gigabyte (GB) associated with it. The cloud system administrator can edit the storage properties which are displayed in the lscloudstoragequota command.

Figures 1, 2:
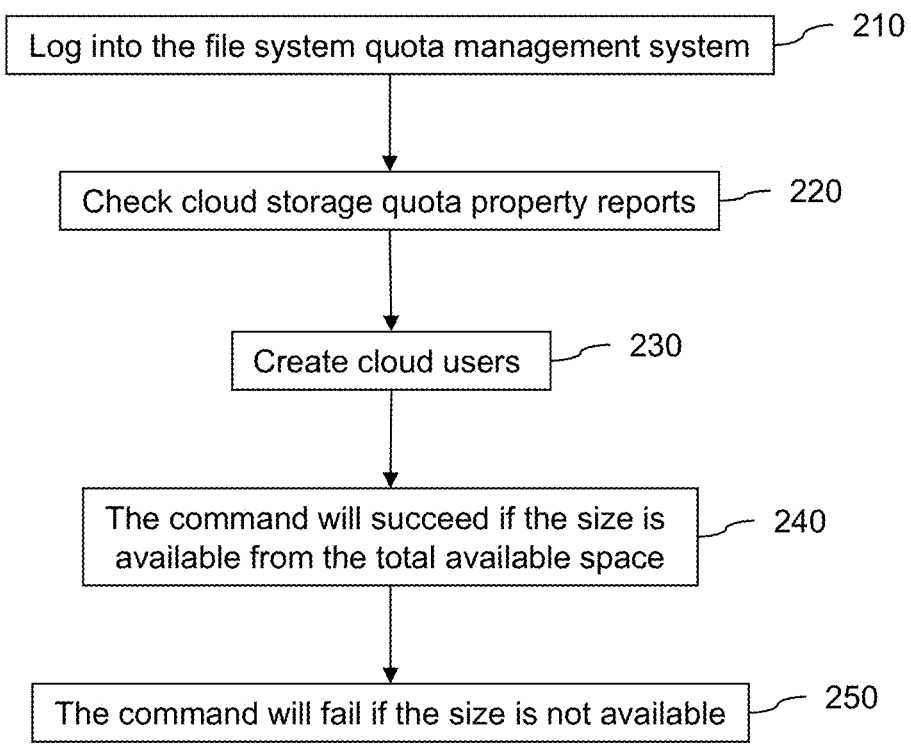
FIG. 1 illustrates a report according to an embodiment of the invention.
FIG. 2 is a flow diagram illustrating a method of configuring a file system quota management system according to an embodiment of the invention.

FIG. 1 illustrates a #Scmsi>lscloudstoragequota report according to an embodiment of the invention. The report is generated by querying storage controllers integrated with the storage cloud system (also referred to herein as the "cloud computing system"). In at least one embodiment, the information queried includes the disk size of the controller, disks types, Redundant Array of Independent Disks (RAID) type, geographic location of the storage devices, and/or time zone. In at least one embodiment, the following system commands can be used to query the storage controllers:
Scmsi>lscloudgeo
China
India
Germany
US
Scmsi>lscloudcapacity
16.5 TB In a geographically spread storage cloud, cost per GB of storage varies per location and depends on various factors, such as cost of management per GB of data, costs of human skills for storage management, electricity costs, costs for carbon credits, currency difference, data center floor costs, government subsidies (some governments have subsidies for cloud technology), security factors, and export factors. So in a storage cloud, one can tier storage based on location and can have a business model wherein the end cloud customer can choose the percentage of storage desired per location.

The SCMSI can further include user properties created at the time of user creation, such as the geographic location of the user and/or the quota set at the time of user creation. In at least one embodiment, the following system command can be used to create user properties:
scmsi>mkscmsiuser-name<Name>-geo_in<Country In>-max_storage_quota<% of total capacity>

The SCMSI can also include user preferences set/reset by the user once the user is created. For example, the user may set/reset the percentage of quota from the quota allocated to him as per the repcloudstoragequota command reported. In another example, some default percentage of quota settings can be done by the storage cloud system; and, the user can override the defaults within the limits defined by storage cloud system. In at least one embodiment, the following system command can be used to set or reset user preferences:

scmsi>chscmsiquota-name<name|userid>-geo_in<geo>-per_size<% size of total capacity allocated>

The user properties and preferences create storage cloud configuration information, which can be a first input to the file system's quota management module. Before any user tries to set the properties of the system scmsi, the administrator or user provides or destroys the user's credentials using scmsi_login/scmsi_logout commands. The system's commands for creating user properties and setting or resetting user preferences create the metadata information. The metadata information is stored in a scmsi_quota.conf file, which is referred to by the file system quota management system in its processing.

The second input includes information related to the integration of device/storage controllers to the file system quota management system. Using the first and second inputs, the file system quota management system becomes aware of geo wise quota requirements.

FIG. 2 is a flow diagram illustrating a method of configuring a file system quota management system according to an embodiment of the invention. The system administrator logs in to the file system quota management system (210) and checks cloud storage quota property reports (220). Cloud users are created (230), for example, using the following system command:

Scmsi>mkscmsiuser-name birla_grp-geo_in Indai-per_size 20

If the size is available from the total available space, then the command will succeed (240), for example, using the following system command to update the system configuration: scmsi_quota.conf If the size is not available, then the command will fail (250). FIG. 3 illustrates other system commands to create cloud users according to an embodiment of the invention.

Figure 4:
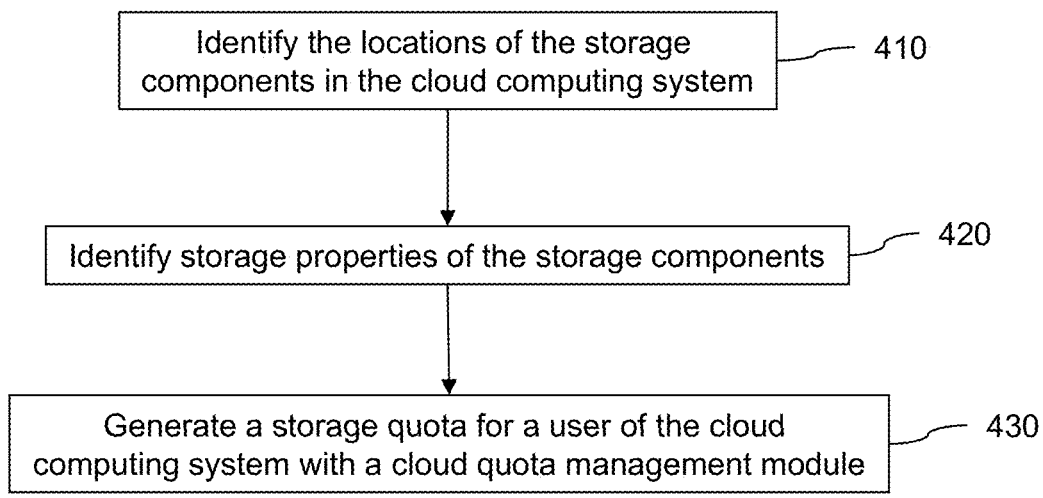
FIG. 4 illustrates a method for storage management in a cloud computing system according to an embodiment of the invention.

FIG. 4 illustrates a method for storage management in a cloud computing system according to an embodiment of the invention. The locations of the storage components in the cloud computing system are identified 410. In at least one embodiment, the storage component locations are identified with a processor. For example, the processor identifies a storage component in the United States, a storage component in China, a storage component in India, and a storage component in Germany.

Storage properties of the storage components are identified 420, wherein the storage properties include the amount of available storage space in each storage component and/or the cost of storage space in each storage component. In at least one embodiment, the storage properties are identified with the processor. For example, FIG. 1 illustrates storage properties for storage components in China, India, Germany, and the United States. In another embodiment, the storage properties include the storage type, size of the storage components, and/or time zone of the location of the storage components. For example, the storage properties for a storage component in India can include the following: Harddisk drives (HDD), Solid state Disk (SSD or Flash), Phase Change Memory, Racetrack Memory, 10,000 GB and India Standard Time (IST). The cost of storage types can vary depending on geographic location. For example, SSD may be less expensive in China as compared to Germany while HDD is more expensive in Germany as compared to China.

In at least one embodiment of the invention, properties of the user are identified (e.g., with the processor). The properties of the user can include the location of the user, the amount of storage space requested by the user, the storage space location(s) requested by the user, and/or the user's initial storage quota. For example, the properties of User A includes: San Francisco, Calif., USA; 150 GB; China and India storage locations; and 500 GB initial storage quota.

A cloud quota management module (also referred to herein as the processor) generates a storage quota for a user of the cloud computing system 430. The storage quota includes the maximum amount of storage allocated to the user in one or more of the storage components. For example, the storage quota for User A is 600 GB (250 GB in US, 150 GB in China, 100 GB in Germany, and 100 GB in India). In another embodiment, the storage quota includes the maximum amount of storage allocated to the user for a storage type in one of the locations. For example, the storage quota for User A is 100 GB of HDD in China, 200 GB of HDD and 150 GB of SSD in India, and 250 GB of SSD in Germany. The storage quota is generated based on the locations of the storage components and/or the storage properties of the storage components. In another embodiment, the storage quota is also based on the properties of the user.

In at least one embodiment of the invention, the storage component that is physically closer to the user in used first. In another embodiment, the storage component that is least expensive in used first. In yet another embodiment, both location and cost are factors, wherein the location that is closest to the user is identified that is below a threshold cost.

In at least one embodiment of the invention, the storage quota is displayed to a user or administrator of the cloud computing system. The displayed storage quota can include the total amount of storage space allocated to the user at each storage component location, the amount of storage space currently utilized by the user at each storage component location, and the amount of storage space currently available to the user at each storage component location. In another embodiment, a notification is sent to the user, wherein the notification includes an updated cost of the storage space and/or an updated storage quota for the user. The updated storage quota for the user is based on the updated cost of storage space.

Figure 5:
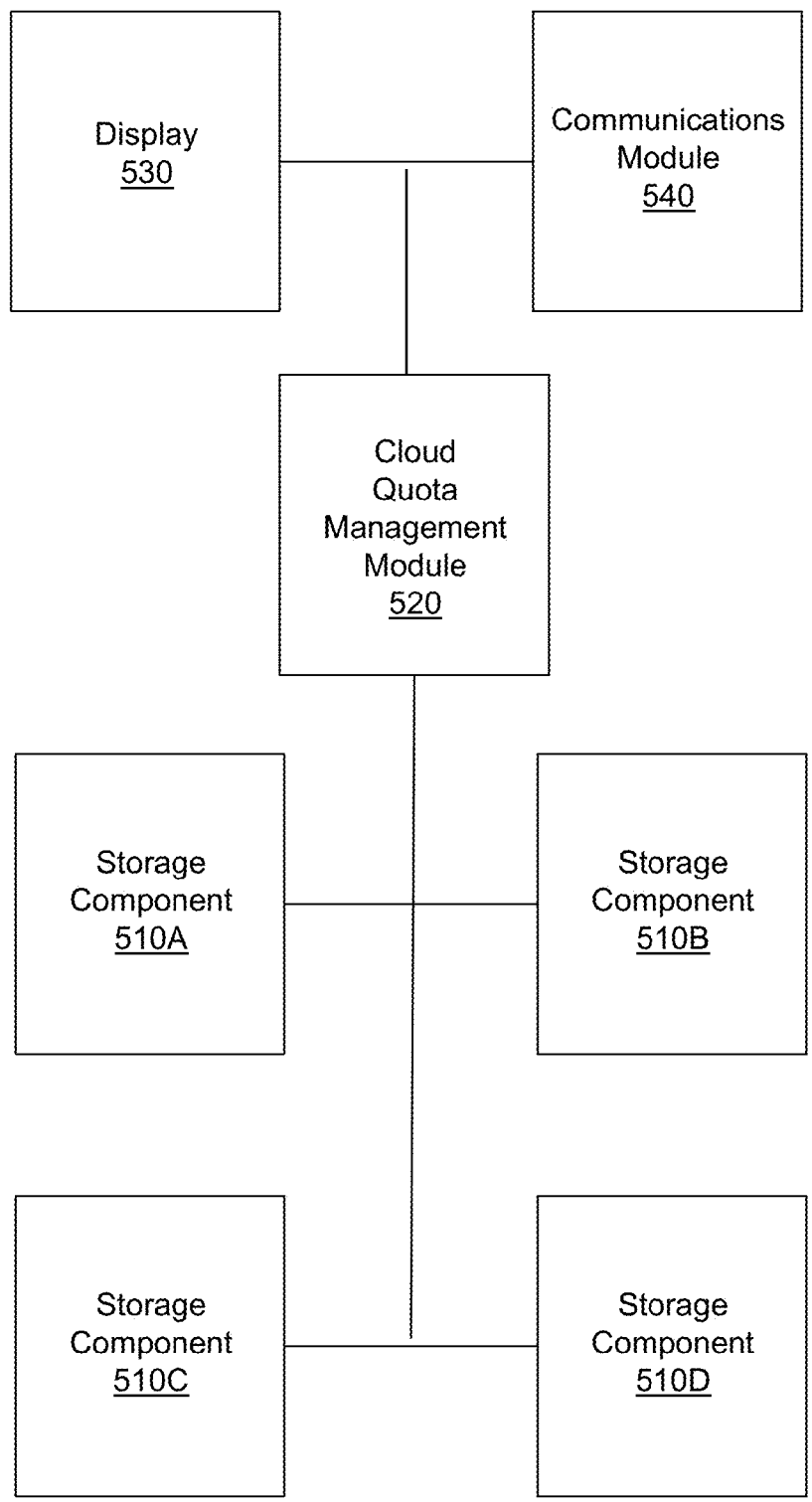
FIG. 5 illustrates a cloud computing system according to an embodiment of the invention.

FIG. 5 illustrates a cloud computing system 500 according to an embodiment of the invention. The cloud computing system 500 includes a plurality of storage components 510 located in different geographical areas (e.g., address, city, state, province, country, continent, time zone). For instance, FIG. 5 illustrates a storage component 510A in the United States, a storage component 510B in Germany, a storage component 510C in India, and a storage component 510D in China.

A cloud quota management module 520 generates a storage quota for a user of the cloud computing system 500, wherein the storage quota is the maximum amount of storage allocated to the user for the storage components 510. In at least one embodiment, the cloud quota management module 520 is a hardware component connected to the storage components 510. As used herein, the term "connected" includes operationally connected, logically connected, in communication with, physically connected, engaged, coupled, contacts, linked, affixed, and attached.

The storage quota is generated based on the locations of the storage components and/or storage properties of the storage components. In at least one embodiment of the invention, the storage properties include the amount of available storage space and/or the cost of the storage space. In another embodiment, the storage properties include the storage type, size of the storage components, and/or time zone where the storage components are located. In at least one embodiment, the cloud quota management module 520 generates the storage quota based on properties of the user, wherein the properties of the user include the location of the user, the amount of storage space requested by the user, location(s) of the storage space requested by the user, and the user's initial storage quota.

At least one embodiment of the invention further includes a display 530 connected to the cloud quota management module 520. The display 530 displays the storage quota, which includes the total amount of storage space allocated to the user at each storage component location, the amount of storage space utilized by the user at each storage component location, and/or the amount of storage space available to the user at each storage component location.

At least one embodiment of the invention further includes a communications module 540 connected to the cloud quota management module 520, wherein the communications module 540 sends a notification to the user. The notification includes an updated cost of storage space and/or an updated storage quota for the user, wherein the updated storage quota for the user is based on the updated cost of storage space.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
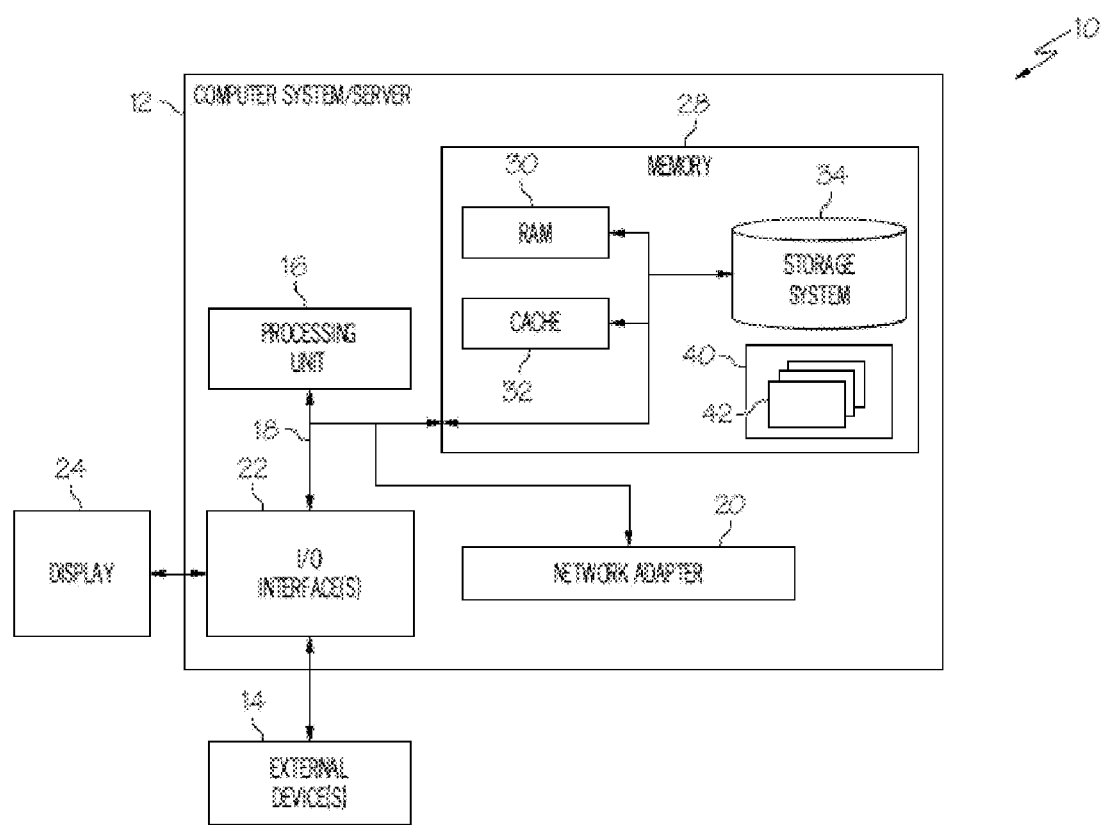
FIG. 6 depicts a cloud computing node according to an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer systemexecutable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
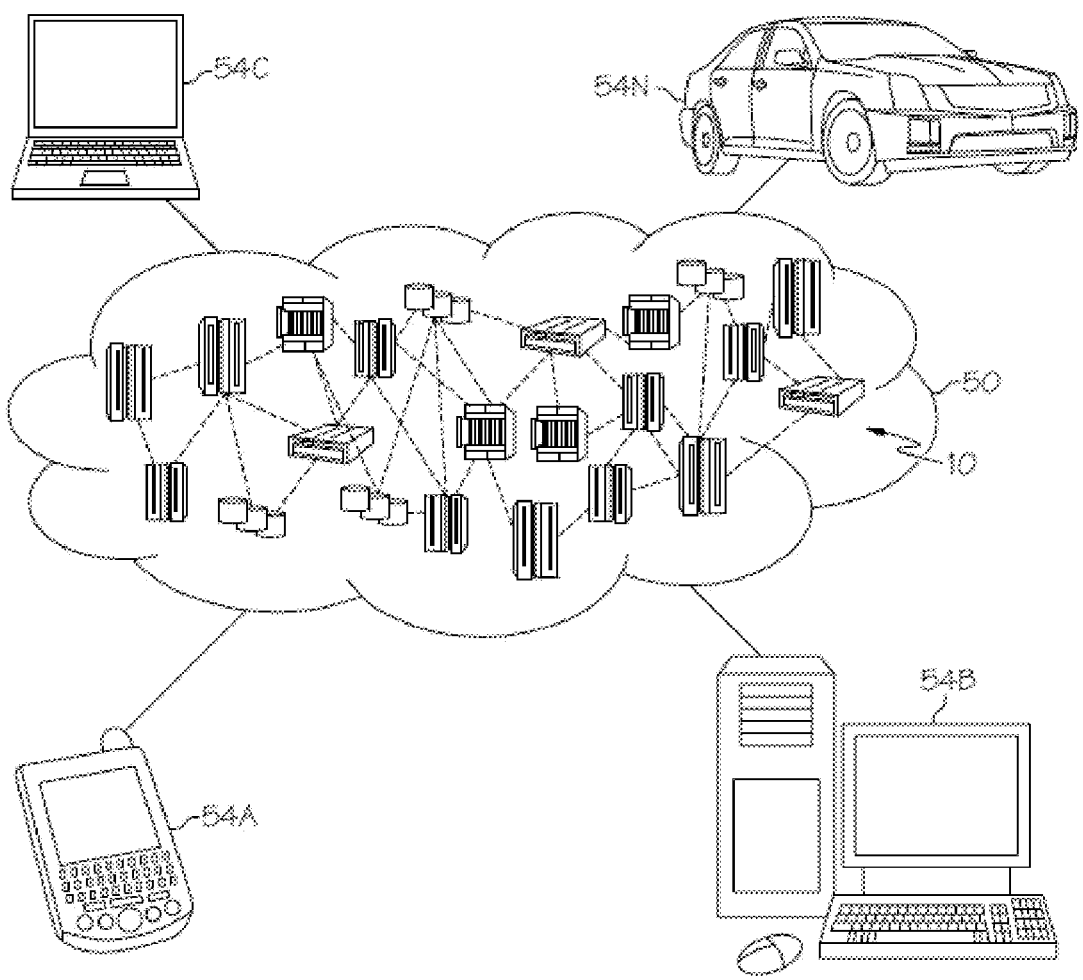
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
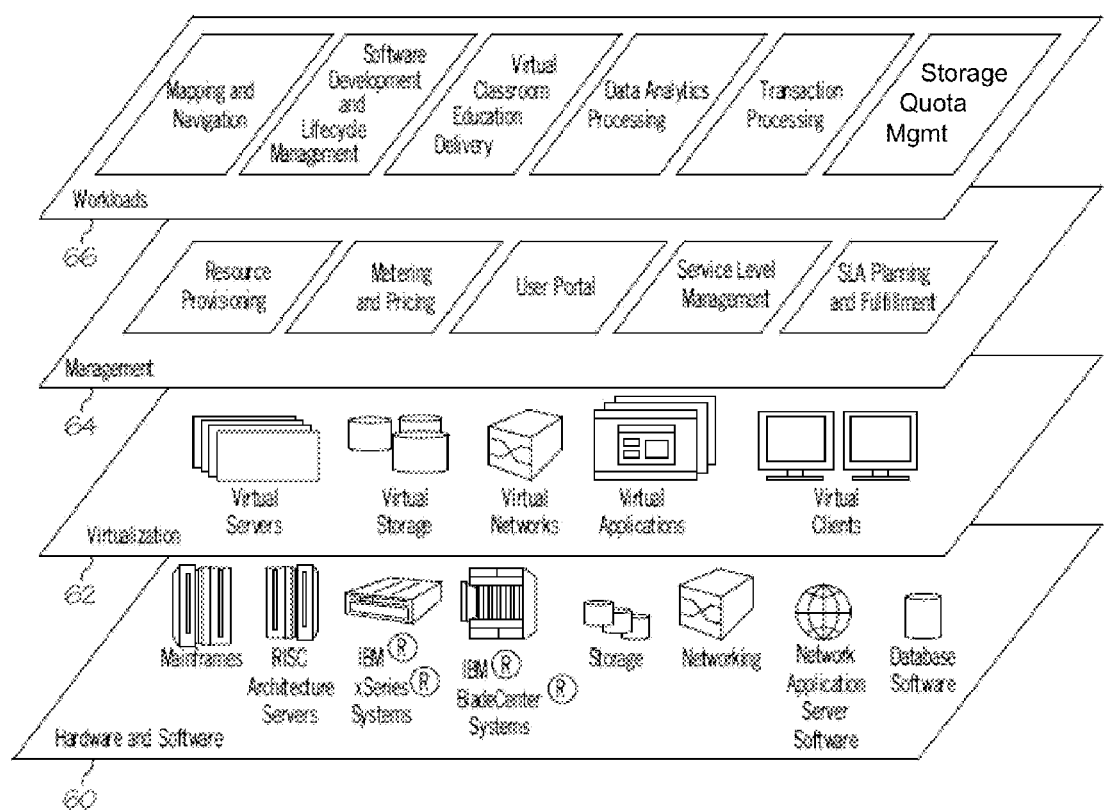
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems;

IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and storage quota management.

An embodiment of the invention provides a method for storage management in a cloud computing system, wherein locations of storage components in the cloud computing system are identified. Storage properties of the storage components are identified, wherein the storage properties include the amount of available storage space and/or the cost of storage space. A storage quota for a user of the cloud computing system is generated with a cloud quota management module. The storage quota is generated based on the locations of the storage components and/or the storage properties of the storage components.

In another embodiment, the storage quota includes the maximum amount of storage allocated to the user in one or more of the storage components. In a further embodiment that can be combined with any of the above embodiments, the storage quota includes the maximum amount of storage allocated to the user for a storage type in one of the locations. In another embodiment that can be combined with any of the above embodiments, properties of the user are identified, wherein the generating of the storage quota for the user is further based on the properties of the user. In still another embodiment that can be combined with any of the above embodiments, the properties of the user include the location of the user, the amount of storage space requested by the user, one or more storage space locations requested by the user, and/or the user's initial storage quota. In still yet another embodiment that can be combined with any of the above embodiments, the storage properties include the storage type, size of the storage components, and/or time zone of the location of the storage components. In a further embodiment that can be combined with any of the above embodiments, the storage quota is displayed, wherein the storage quota includes the total amount of storage space allocated to the user at each storage component location, the amount of storage space utilized by the user at each storage component location, and/or the amount of storage space available to the user at each storage component location. In another embodiment that can be combined with any of the above embodiments, a notification is sent to the user. The notification can include an updated cost of storage space and an updated storage quota for the user, wherein the updated storage quota for the user is based on the updated cost of storage space.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a non-transitory computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
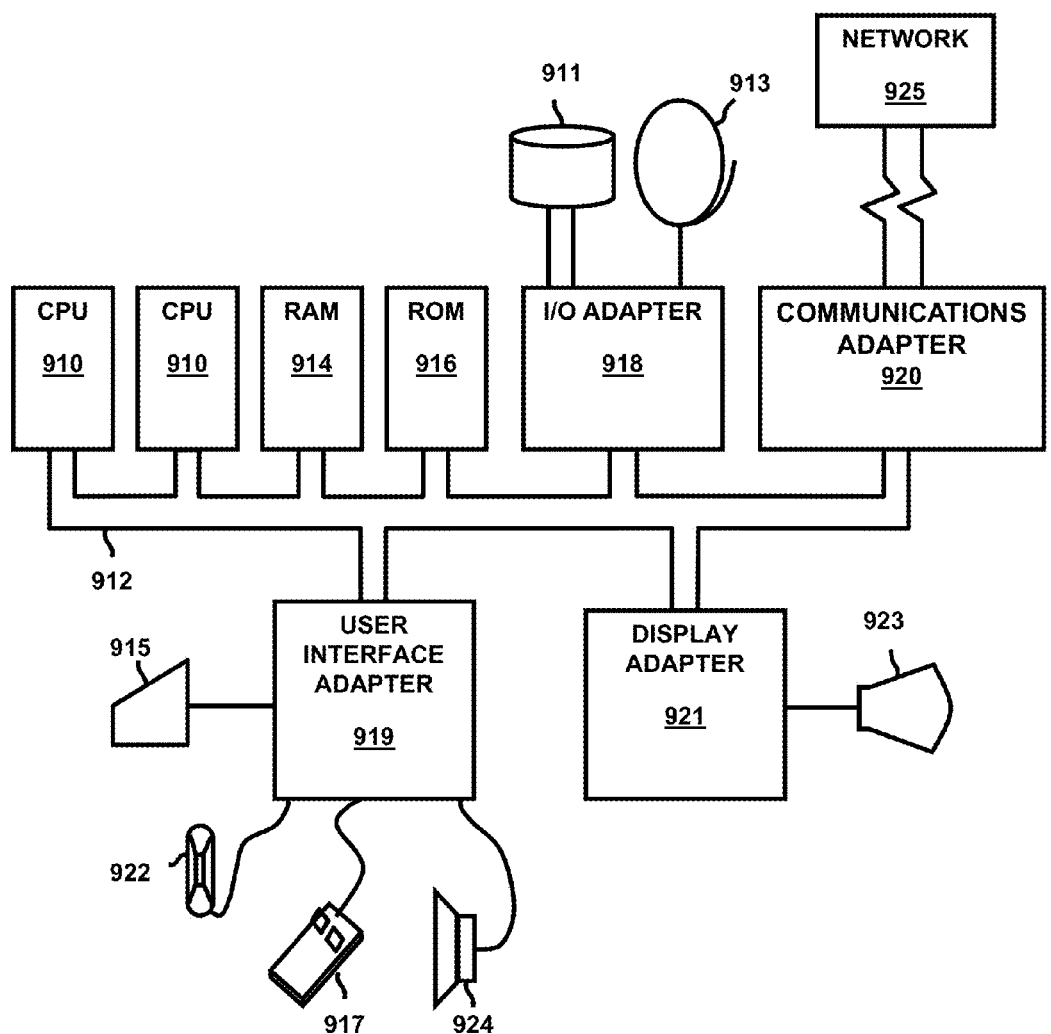
FIG. 9 illustrates a computer program product according to an embodiment of the invention.

Referring now to FIG. 9, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 910. The CPUs 910 are interconnected with system bus 912 to various devices such as a random access memory (RAM) 914, read-only memory (ROM) 916, and an input/output (I/O) adapter 918. The I/O adapter 918 can connect to peripheral devices, such as disk units 911 and tape drives 913, or other program storage devices that are readable by the system. The system can read the inventive instructions on the program storage devices and follow these instructions to execute the methodology of at least one embodiment of the invention. The system further includes a user interface adapter 919 that connects a keyboard 915, mouse 917, speaker 924, microphone 922, and/or other user interface devices such as a touch screen device (not shown) to the bus 912 to gather user input. Additionally, a communication adapter 920 connects the bus 912 to a data processing network 925, and a display adapter 921 connects the bus 912 to a display device 923 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for storage management in a global cloud computing system, said method comprising:
   identifying locations of storage components in the cloud computing system, the storage components located in different countries;
   identifying storage properties of the storage components, the storage properties including an amount of available storage space, a cost of storage space, and the location of the storage components;
   creating storage configuration information from properties of the user, which is one or more processors connected to the storage components;
   monitoring storage components of the global cloud computing system with theone or more processors, the monitoring determining a maximum amount of storage to allocate to the user in the storage components and being calculated based on the storage and properties of the user, wherein the properties of the user include a geographic location of the user and at least one location of storage components requested by the user, and the storage properties include storage types and a proximity of the storage components with respect to the user location; and allocating storage based on the monitoring.

2. The method according to claim 1, wherein the properties of the user include an amount of storage space requested by the user.

3. The method according to claim 1, wherein the storage properties further include the size of the storage components, wherein the storage types include one of harddisk drives, solid state disk, flash, phase change memory, and racetrack memory.

4. The method according to claim 1, further comprising:
displaying a storage quota, the storage quota including a total amount of storage space allocated to the user at each storage component location, an amount of storage space utilized by the user at each storage component location, and an amount of storage space available to the user at each storage component location.

5. The method according to claim 4, further comprising:
sending a notification to the user, the notification including:
an updated cost of storage space; and
an updated storage quota for the user, the updated storage quota for the user being based on the updated cost of storage space.

6. The method according to claim 1, further comprising receiving preferences of the user as an input to the one or more processors.

7. The method according to claim 1, wherein the cost of storage space depends on cost of management per GB of data, costs of human skills for storage management, electricity costs, costs for carbon credits, currency difference, data center floor costs, government subsidies, security factors, or export factors.

8. The method according to claim 1, further comprising the user choosing a percentage of storage desired per location.

9. A cloud computing system comprising:
a plurality of storage components located in different countries;
one or more processors connected to said storage components located in different countries, said one or more processors monitoring the storage components of the global cloud computing system for a user to determine a maximum amount of storage to allocate, the allocation being calculated based on storage properties of the storage components, and properties of the user including the location of the user and at least one location of storage components requested by the user, the storage properties including storage types, an amount of available storage space, a cost of storage space, a proximity of the storage components with respect to the user location, and a time zone of the location of the storage components,
wherein the one or more processors allocate storage based on the monitoring.

10. The cloud computing system according to claim 9, wherein the properties of the user further include an amount of storage space requested by the user, and the user's initial storage quota.

11. The cloud computing system according to claim 9, wherein the storage properties further include storage type and size of the storage components.

12. The cloud computing system according to claim 9, further comprising a communications module connected to said cloud quota management module, said communications module sends a notification to the user, the notification including:
an updated cost of storage space; and
an updated storage quota for the user, the updated storage quota for the user being based on the updated cost of storage space.

13. A non-transitory computer-readable medium having computer-readable instructions stores thereon which when executed by a computer cause the computer to preform a method for storage management in a global cloud computing system, the method comprising:
identifying locations of storage components in the cloud computing system, the storage components located in different countries;
identifying storage properties of the storage components, the storage properties including at least one of an amount of available storage space and a cost of storage space;
creating storage configuration information from the properties of the user, which is input to one or more processors connected to the storage components;
monitoring, via the one or more processors, storage components of the cloud computing system, the monitoring determining a maximum amount of storage to allocate to the user in the storage components and being calculated based on the storage properties of the storage components and properties of the user, wherein the properties of the user include a geographic location of the user and at least one location of storage space requested by the user, and the storage properties include storage types and a proximity of the storage components with respect to the user location; and
allocating storage based on the monitoring.

* * * * *